US012125088B2

(12) United States Patent
Sato et al.

(10) Patent No.: US 12,125,088 B2
(45) Date of Patent: Oct. 22, 2024

(54) PROCESSING APPARATUS, PROCESSING METHOD, AND NON-TRANSITORY STORAGE MEDIUM

(71) Applicant: NEC Corporation, Tokyo (JP)

(72) Inventors: Takami Sato, Tokyo (JP); Kota Iwamoto, Tokyo (JP); Soma Shiraishi, Tokyo (JP)

(73) Assignee: NEC Corporation, Tokyo (JP)

( * ) Notice: Subject to any disclaimer, the term of this patent is extended or adjusted under 35 U.S.C. 154(b) by 263 days.

(21) Appl. No.: 17/635,049

(22) PCT Filed: Aug. 21, 2019

(86) PCT No.: PCT/JP2019/032606
§ 371 (c)(1),
(2) Date: Feb. 14, 2022

(87) PCT Pub. No.: WO2021/033285
PCT Pub. Date: Feb. 25, 2021

(65) Prior Publication Data
US 2022/0284493 A1 Sep. 8, 2022

(51) Int. Cl.
G06Q 30/06 (2023.01)
G06F 16/9535 (2019.01)
(Continued)

(52) U.S. Cl.
CPC ..... *G06Q 30/0623* (2013.01); *G06F 16/9535* (2019.01); *G06F 16/955* (2019.01)

(58) Field of Classification Search
CPC ............ G06Q 30/0623; G06Q 30/0601; G06F 16/955; G06F 16/9535
(Continued)

(56) References Cited

U.S. PATENT DOCUMENTS

| 2001/0039546 A1* | 11/2001 | Moore ................ G06F 16/9537 |
| 2010/0106565 A1* | 4/2010 | Manesh ............. G06Q 30/0633 |
| | | 705/26.1 |
| 2012/0130954 A1* | 5/2012 | Hood .................... G06Q 10/10 |
| | | 707/640 |

(Continued)

FOREIGN PATENT DOCUMENTS

| JP | 2003-065826 A | 2/2003 |
| JP | 2004-030409 A | 1/2004 |

(Continued)

OTHER PUBLICATIONS

Article, "Yahoo Files United States Patent Application for Methods of Dynamically Creating Personalized Internet Advertisements Based on Content"; Global IP News. Advertising Patent News [New Delhi] Oct. 16, 2014, retrieved from Dialog on Mar. 1, 2023 (Year: 2014).*

(Continued)

*Primary Examiner* — Yogesh C Garg
(74) *Attorney, Agent, or Firm* — Michael Dryja

(57) ABSTRACT

The present invention provides a processing apparatus (10) including: a web product image acquisition unit (11) acquiring a web product image publicly available in a web page determined based on a predetermined search condition; a product identification information acquisition unit (12) acquiring product identification information of a product indicated by the web product image; and a registration unit (13) registering the web product image and the product identification information in association with each other in a product database.

11 Claims, 13 Drawing Sheets

(51) Int. Cl.
*G06F 16/955* (2019.01)
*G06Q 30/0601* (2023.01)

(58) Field of Classification Search
USPC .......................................... 705/26.81, 26.61
See application file for complete search history.

(56) References Cited

U.S. PATENT DOCUMENTS

| | | |
|---|---|---|
| 2016/0171426 A1 | 6/2016 | Fujimoto et al. |
| 2017/0011378 A1 | 1/2017 | Inque et al. |

FOREIGN PATENT DOCUMENTS

| | | | |
|---|---|---|---|
| JP | 2005-161053 A | 6/2005 | |
| JP | 2009-251850 A | 10/2009 | |
| JP | 2011-228830 A | 11/2011 | |
| JP | 2016-110537 A | 6/2016 | |
| JP | 2017-062703 A | 3/2017 | |
| JP | 2017-220198 A | 12/2017 | |
| JP | 2018-128883 A | 8/2018 | |
| KR | 20160022407 A | * 3/2016 | ............ G06Q 30/02 |
| WO | 2015/140855 A1 | 9/2015 | |

OTHER PUBLICATIONS

Japanese Office Action for JP Application No. 2021-541404, mailed on Feb. 28, 2023 with English Translation.
International Search Report for PCT Application No. PCT/JP2019/032606, mailed on Nov. 26, 2019.
JP Office Action for JP Application No. 2021-541404, mailed on Aug. 8, 2023 with English Translation.

* cited by examiner

FIG. 3

| PRODUCT CODE | PRODUCT NAME | UNIT PRICE | IMAGE IDENTIFICATION INFORMATION | SEARCH CONDITION | ... |
|---|---|---|---|---|---|
| 13121187 | AFTERNOON CHOCOLATE | 219 | C3180 | • http://・・・・・<br>• "AFTERNOON CHOCOLATE" + "RENEWAL" | ... |
| 01013328 | EVERLASTING SUMMER CURRY | 327 | | • http://・・・・・<br>• "EVERLASTING SUMMER CURRY" + ("NEW PRODUCT" or "NEWLY RELEASED" or ...) | ... |
| .... | .... | .... | .... | .... | .... |

FIG. 7

| PRODUCT CODE | PRODUCT NAME | UNIT PRICE | IMAGE IDENTIFICATION INFORMATION | SEARCH CONDITION | IMAGE CONDITION | SHAPE | ... |
|---|---|---|---|---|---|---|---|
| 13121187 | AFTERNOON CHOCOLATE | 219 | C3180 | ∗http://∙∙∙∙∙∙<br>∗"AFTERNOON CHOCOLATE"<br>+"RENEWAL" | ∗RECTANGLE (3:7)<br>∗... | ∗∗∗ | ... |
| 01013328 | EVERLASTING SUMMER CURRY | 327 | | ∗http://∙∙∙∙∙∙<br>∗"EVERLASTING SUMMER CURRY"<br>+("NEW PRODUCT" or "NEWLY RELEASED" or ...) | | | |
| .... | .... | .... | .... | .... | .... | .... | .... |

PROCESSING APPARATUS, PROCESSING METHOD, AND NON-TRANSITORY STORAGE MEDIUM

This application is a National Stage Entry of PCT/JP2019/032606 filed on Aug. 21, 2019, the contents of all of which are incorporated herein by reference, in their entirety.

TECHNICAL FIELD

The present invention relates to a processing apparatus, a processing method, and a program.

BACKGROUND ART

Patent Documents 1 to 3 disclose technologies for capturing images of a product to be checked out from a plurality of directions by a plurality of cameras in a technique for recognizing and registering a product to be checked out, based on a captured image of the product to be checked out and preregistered reference images of products.

Patent Document 4 discloses a technique for capturing images of a plurality of appearances of a product to be checked out by using mirrors in the technique for recognizing and registering a product to be checked out, based on a captured image of the product to be checked out and preregistered reference images of products.

Patent Document 5 discloses a technique for associating an image generated by a camera with product identification information read by a barcode reader.

RELATED DOCUMENT

Patent Document

Patent Document 1: Japanese Patent Application Publication No. 2017-220198
Patent Document 2: Japanese Patent Application Publication No. 2017-62703
Patent Document 3: Japanese Patent Application Publication No. 2016-110537
Patent Document 4: International Application Publication No. WO 2015/140855
Patent Document 5: Japanese Patent Application Publication No. 2004-30409

DISCLOSURE OF THE INVENTION

Technical Problem

In the technique for recognizing and registering a product to be checked out based on a captured image of the product to be checked out and preregistered reference images of products, the reference images of the products need to be preregistered. Conventionally, a means for efficiently registering reference images of products has not existed. None of Patent Documents 1 to 5 describes or suggests the issue and a solution thereof.

An object of the present invention is to provide a technique for efficiently registering reference images of products.

Solution to Problem

The present invention provides a processing apparatus including:

a web product image acquisition means for acquiring a web product image publicly available in a web page determined based on a predetermined search condition;
a product identification information acquisition means for acquiring product identification information of a product indicated by the web product image; and
a registration means for registering the web product image and the product identification information in association with each other in a product database.

Further, the present invention provides a processing method including, by a computer:

acquiring a web product image publicly available in a web page determined based on a predetermined search condition;
acquiring product identification information of a product indicated by the web product image; and
registering the web product image and the product identification information in association with each other in a product database.

Further, the present invention provides a program causing a computer to function as:

a web product image acquisition means for acquiring a web product image publicly available in a web page determined based on a predetermined search condition;
a product identification information acquisition means for acquiring product identification information of a product indicated by the web product image; and
a registration means for registering the web product image and the product identification information in association with each other in a product database.

Advantageous Effects of Invention

The present invention provides a technique for efficiently registering reference images of products.

BRIEF DESCRIPTION OF THE DRAWINGS

The aforementioned object, other objects, features and advantages will become more apparent by the following preferred example embodiments and accompanying drawings.

FIG. 3 is a diagram schematically illustrating an example of information processed by the processing apparatus according to the present example embodiment.

FIG. 7 is a diagram schematically illustrating an example of information processed by the processing apparatus according to the present example embodiment.

DESCRIPTION OF EMBODIMENTS

First Example Embodiment

First, an outline of a processing apparatus according to the present example embodiment will be described. The processing apparatus acquires a web product image publicly available in a web page determined based on a predetermined search condition. Next, the processing apparatus acquires product identification information of a product indicated by the acquired web product image. Then, the processing apparatus registers the acquired web product image and the acquired product identification information in association with each other in a product database. Such a processing apparatus can efficiently register reference images of products in the product database. A configuration of the processing apparatus will be described in detail below.

Figure 1:
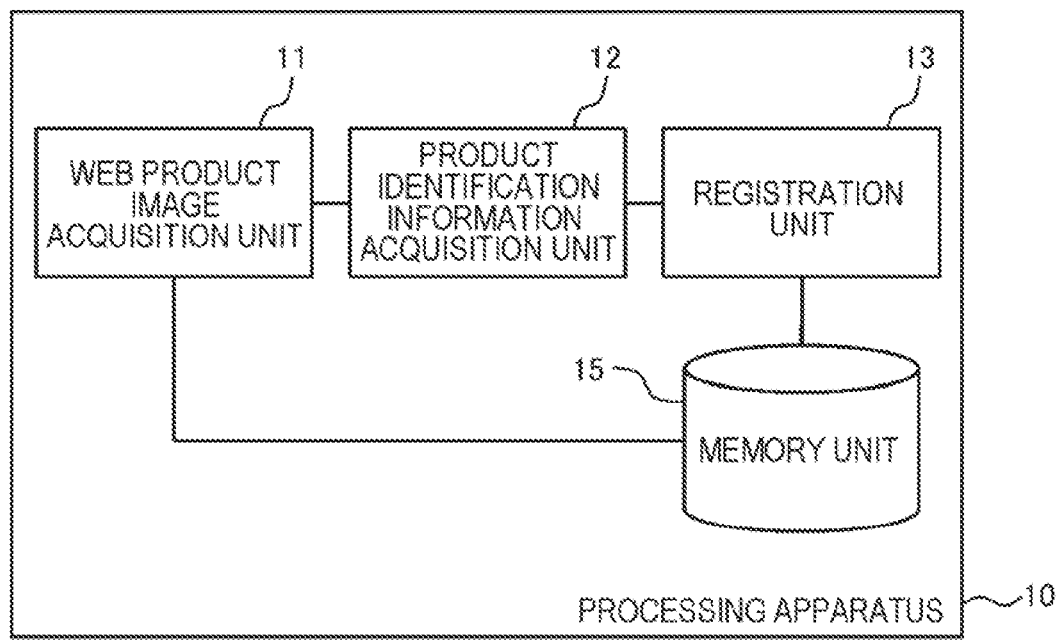
FIG. 1 is an example of a functional block diagram of a processing apparatus according to the present example embodiment.

FIG. 1 illustrates an example of a functional block diagram of a processing apparatus 10. As illustrated, the processing apparatus 10 includes a web product image acquisition unit 11, a product identification information acquisition unit 12, a registration unit 13, and a memory unit 15. Note that the processing apparatus 10 may not include the memory unit 15. In this case, an external apparatus configured to be communicable with the processing apparatus 10 includes the memory unit 15.

Each functional unit in the processing apparatus 10 is provided by any combination of hardware and software centered on a central processing unit (CPU), a memory, a program loaded in the memory, a storage unit [capable of storing not only a program previously stored in a shipping stage of the apparatus but also a program downloaded from a storage medium, such as a compact disc (CD), or a server or the like on the Internet] storing the program, such as a hard disk, and a network connection interface that are included in any computer. Then, it should be understood by a person skilled in the art that various modifications to the implementation method and the apparatus can be made.

Figure 2:
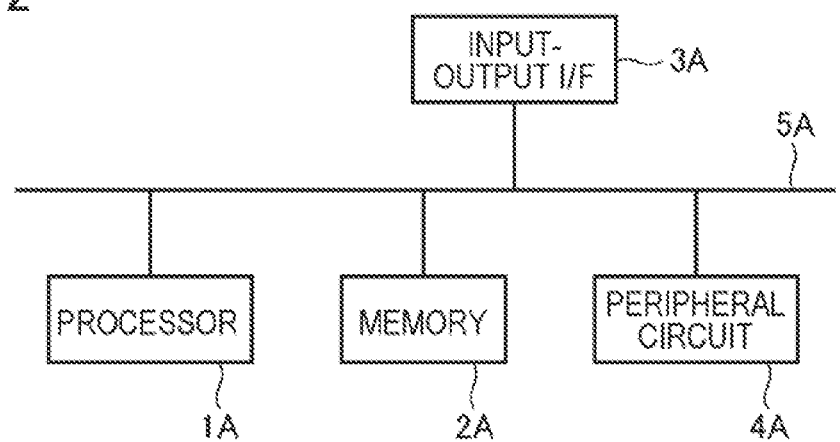
FIG. 2 is a diagram illustrating an example of a hardware configuration of the processing apparatus according to the present example embodiment.

FIG. 2 is a block diagram illustrating a hardware configuration of the processing apparatus 10. As illustrated in FIG. 2, the processing apparatus 10 includes a processor 1A, a memory 2A, an input-output interface 3A, a peripheral circuit 4A, and a bus 5A. The peripheral circuit 4A includes various modules. The processing apparatus 10 may not include the peripheral circuit 4A. Note that the processing apparatus 10 may be configured with a plurality of physically and/or logically separated apparatuses or may be configured with a single physically and/or logically integrated apparatus. When the processing apparatus 10 is configured with a plurality of physically and/or logically separated apparatuses, each of the plurality of apparatuses may include the aforementioned hardware configuration.

The bus 5A is a data transmission channel for the processor 1A, the memory 2A, the peripheral circuit 4A, and the input-output interface 3A to transmit and receive data to and from one another. Examples of the processor 1A include arithmetic processing units such as a CPU and a graphics processing unit (GPU). Examples of the memory 2A include memories such as a random access memory (RAM) and a read only memory (ROM). For example, the input-output interface 3A includes an interface for acquiring information from an input apparatus, an external apparatus, an external server, an external sensor, and a camera, and an interface for outputting information to an output apparatus, an external apparatus, and an external server. Examples of the input apparatus include a keyboard, a mouse, a microphone, a physical button, and a touch panel. Examples of the output apparatus include a display, a speaker, a printer, and a mailer. The processor 1A can issue an instruction to each module and operate based on the operation result of the module.

Next, returning to FIG. 1, a configuration of each functional unit in the processing apparatus 10 will be described in detail.

First, an assumption in the present example embodiment will be described. In the present example embodiment, not only "a product whose product image is not registered in the product database" but also "a product whose product image is registered in the product database" may be a target of processing of acquiring a web product image and registering the image in the product database (hereinafter referred to as "an image acquisition target").

For example, "a product whose product image is not registered in the product database" is a product which is not registered in the product database due to the product not having been handled at the store up to that point but needs to be registered due to the product being newly handled, such as a new product. On the other hand, for example, "a product whose product image is registered in the product database" is a product which is registered in the product database due to the product having been handled at the store up to that point but needs to be newly registered due to a change in the appearance of the product due to a renewal or the like.

The description of each functional unit is resumed. The memory unit 15 stores the product database. FIG. 3 schematically illustrates an example of the product database. In the illustrated example, a product code, a product name, a unit price, information for identifying a registered image (image identification information such as a file name), and a search condition are associated with one another. Note that the product database may include another type of information and may not include part of the exemplified information.

A product associated with image identification information (that is, a product a product image of which is registered) and a product not associated with image identification information (that is, a product a product image of which is not registered) exist in the illustrated example. For example, a product not associated with image identification information is a product newly handled at the store and is a product a product image of which is not yet registered. Note that the product is registered in the product database although a product image is not registered, because information such as a product code, a product name, and a unit price is already acquired.

The web product image acquisition unit 11 performs a web search, based on a predetermined search condition, and acquires a web product image publicly available in a determined web page. The web product image acquisition unit 11 may perform a web search at a predetermined timing (for example, at a predetermined time every day) or may perform a web search at a timing when instruction input is performed by a user. Instruction input by a user may be performed for each product. In this case, a web search is performed based on a search condition associated with a specified product. A search condition may be stored in the memory unit 15 as illustrated in FIG. 3. Further, a search condition may be defined and registered for each product as illustrated in FIG. 3 or may be defined and registered without a constraint such as to be defined and registered for each product.

Figure 4:
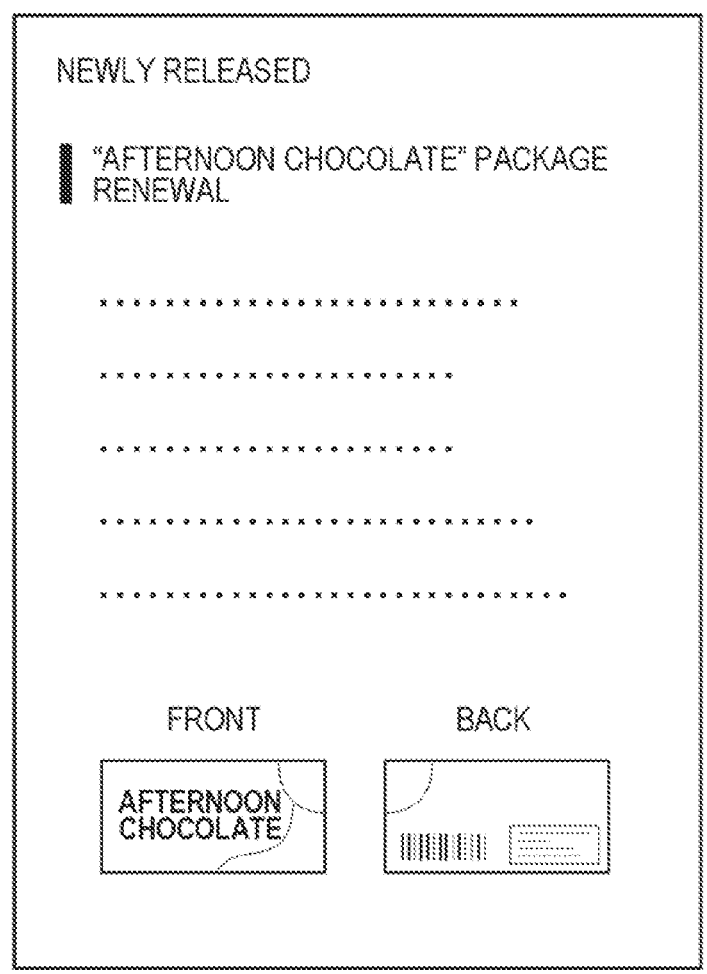
FIG. 4 is a diagram schematically illustrating an example of a web page searched by the processing apparatus according to the present example embodiment.
Figure 5:
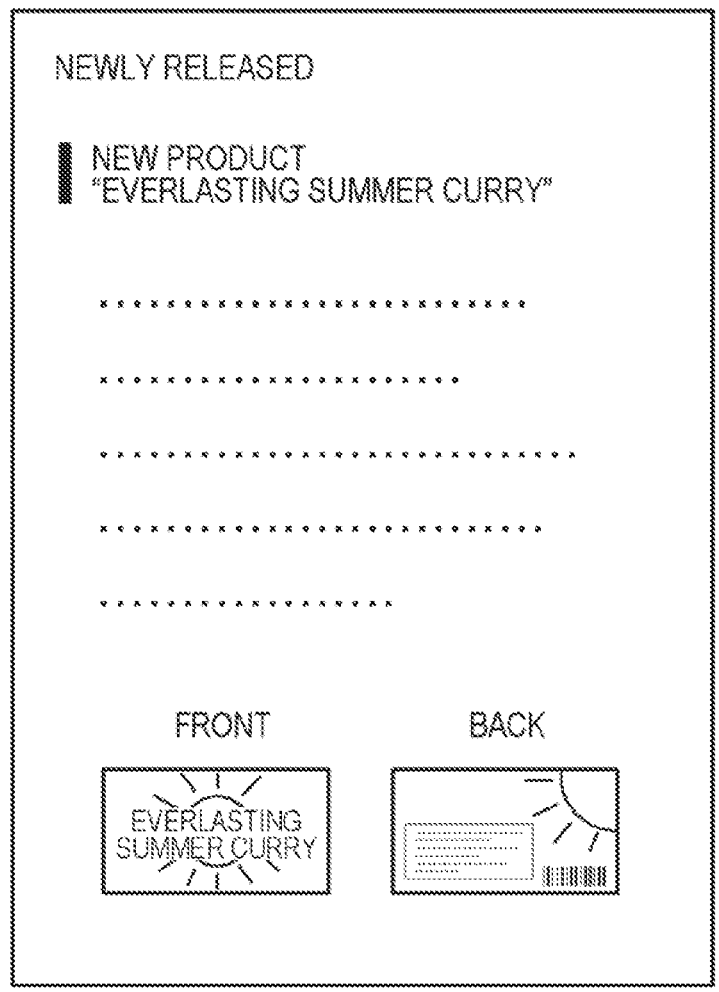
FIG. 5 is a diagram schematically illustrating an example of a web page searched by the processing apparatus according to the present example embodiment.
Figure 6:
FIG. 6 is a diagram schematically illustrating an example of a web page searched by the processing apparatus according to the present example embodiment.

A search condition is specified in such a way as to be able to determine (search for), in a web search, a web page in which an image of an image acquisition target is publicly available. FIG. 4 to FIG. 6 illustrate examples of such a web page. Examples of such a web page include a product information site by a product manufacturer, a news release site (see FIG. 4 and FIG. 5), an information-disseminating site of a wholesaler or a retailer, such as a blog (see FIG. 6), but are not limited thereto.

For example, a search condition may directly specify a web page of a site as described above by a URL.

In addition, a search condition may be a condition for a web search defined by, for example, linking keywords by logical operators. For example, a search condition may be keywords related to an image acquisition target (such as a product name and a manufacturer name) and keywords related to an image (such as an image and a photograph) linked by logical operators. Further, for example, a search condition may include keywords that tend to be attached to a new product such as "new product" and "New." Further, for example, a search condition may include keywords that tend to be attached to a product the appearance of which is changed due to a renewal, such as "renewal" and "design change."

Note that, when a web search is performed on a search condition specified by keywords, a plurality of web pages may be hit. In this case, the web product image acquisition unit 11 may determine the highest predetermined number of web pages out of the plurality of web pages included in the search result as a web search result and acquire web product images publicly available in the determined web pages.

Next, details of "processing of acquiring a web product image publicly available in a web page determined by a web search" will be described.

First, the web product image acquisition unit 11 analyzes a web page determined by a web search and acquires an image (image file) publicly available in the web page. Subsequently, the web product image acquisition unit 11 analyzes the acquired image and eliminates an image satisfying a predetermined elimination condition out of a plurality of acquired images. Then, the web product image acquisition unit 11 acquires an image remaining after the elimination as a web product image.

Examples of an elimination condition include "the image size being smaller than a reference value," "being a preregistered elimination target image (such as a logo being continuously displayed in the site and being irrelevant to the product), and "an estimation result of a subject based on an 'estimation model estimating a subject included in an image' generated by machine learning being a target other than the product (such as a person, an animal, a mountain, and the sea) but are not limited thereto.

In addition, for example, the shape of each product may be preregistered in the product database, as illustrated in FIG. 7. For example, the shape of a product may be indicated by a planar shape when the product is observed from one or a plurality of directions. A planar shape may be defined as a "circle" or a "rectangle (aspect ratio 3:7)" or may be defined by an image indicating a silhouette of the product. In addition, the shape of a product may be indicated by three-dimensional information. Then, an elimination condition may be "the shape of a subject included in an image not agreeing with a registered product shape." In this case, the web product image acquisition unit 11 determines whether a subject included in an image acquired from a web page determined by a web search based on a search condition of each product satisfies a shape registered in association with the product. When making the determination, the web product image acquisition unit 11 may make a comparison with a registered planar shape while rotating the subject included in the image. In addition, the web product image acquisition unit 11 may generate a planar image when the product is observed from each of a plurality of directions by using three-dimensional information registered in the product database as the shape of the product and make a comparison with the shape of the subject included in the image acquired from the web page.

In addition, an elimination condition may be "being specified by a user as an elimination target." Specifically, the web product image acquisition unit 11 may provide (for example, display on a display) the whole or a part of acquired images to a user and accept an input about whether to keep each image as a web product image. In this case, an image automatically eliminated by another elimination condition as described above may be removed from the checking target by the user. Thus, a load on the user is lightened.

In the provision of acquired images to a user and the acceptance processing of an input, the user may specify and register a predetermined image (such as a logo being continuously displayed in the site and being irrelevant to the product) as the aforementioned elimination target image.

Note that the web product image acquisition unit 11 may perform image editing processing on an image acquired from a web screen. The web product image acquisition unit 11 may eliminate part of the images acquired from the aforementioned web screen and perform the image editing processing before processing of acquiring the remaining images as web product images, may perform the image editing processing after the processing, or perform a part of the image editing processing before the processing and the other part after the processing.

For example, the web product image acquisition unit 11 may perform editing of determining an area in which a product exists in a web product image and eliminating the remaining background area.

Figure 8:
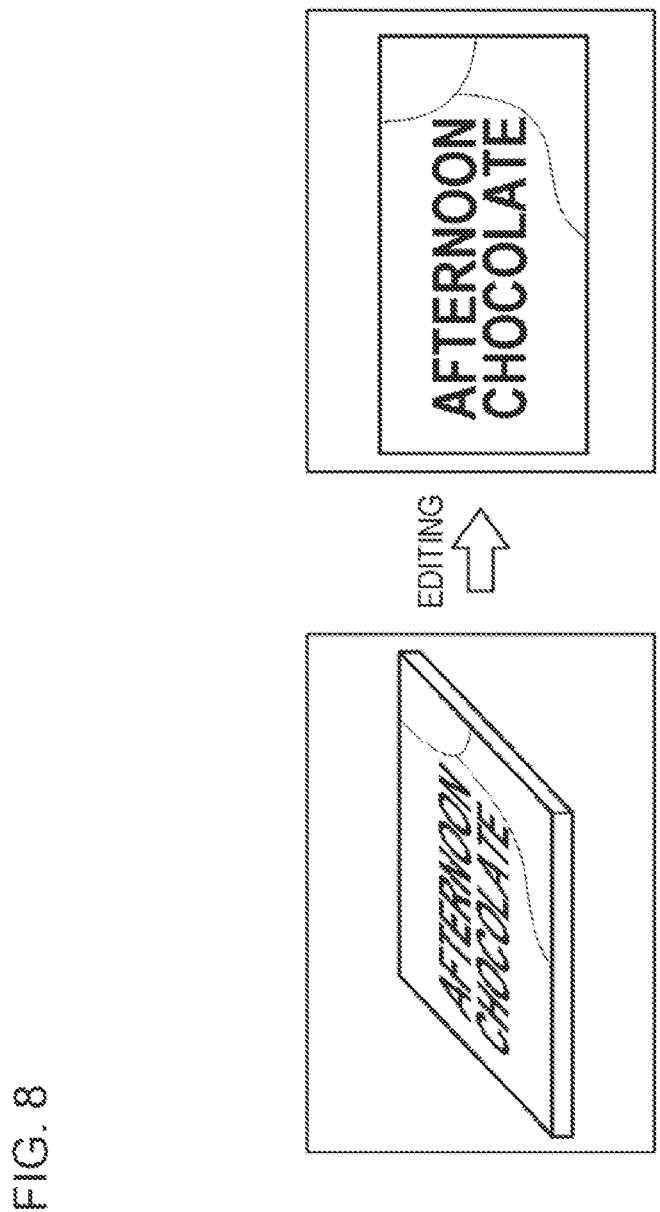
FIG. 8 is a diagram schematically illustrating an example of image editing performed by the processing apparatus according to the present example embodiment.
Figure 9:
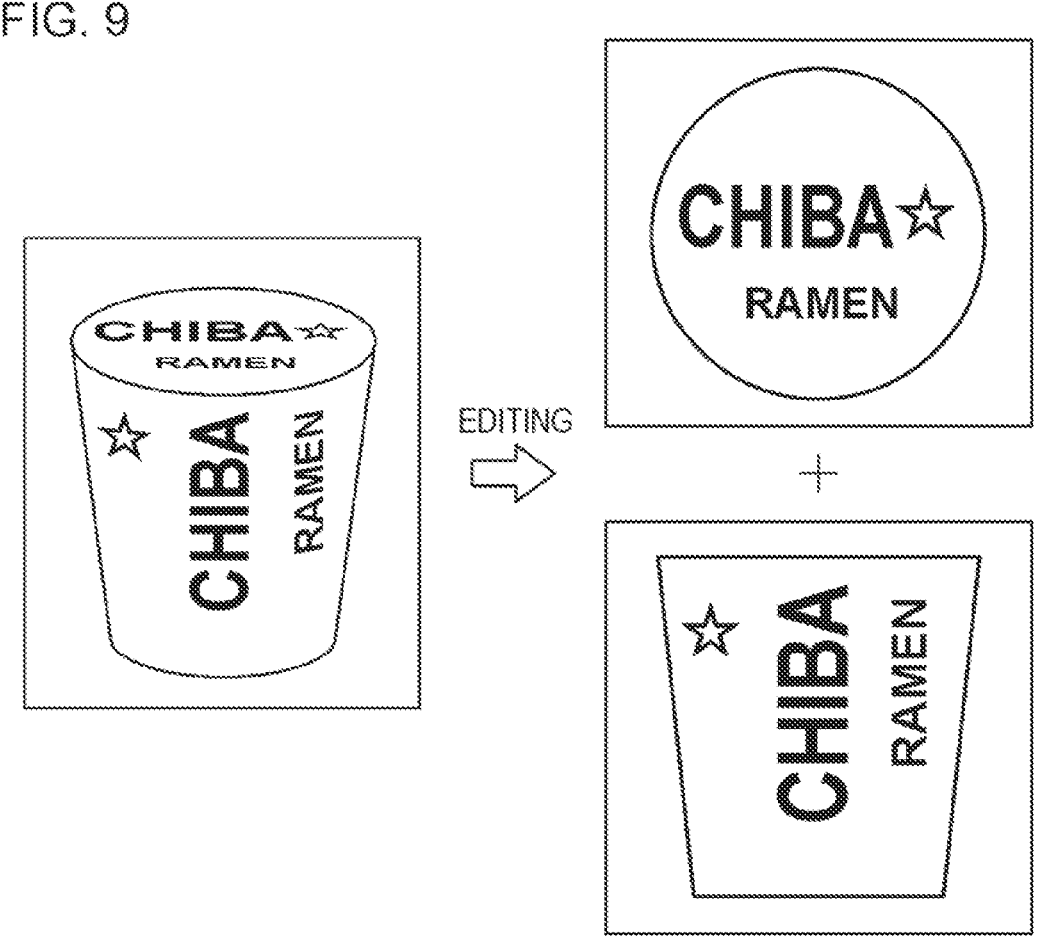
FIG. 9 is a diagram schematically illustrating an example of the image editing performed by the processing apparatus according to the present example embodiment.

In addition, the web product image acquisition unit 11 may perform editing of changing the direction of a product indicated by a web product image, as illustrated in FIG. 8. In FIG. 8, a perspective view is changed to a front view. In addition, the web product image acquisition unit 11 may generate a plurality of images indicating states of a product being indicated by a web product image and being observed from a plurality of directions, as illustrated in FIG. 9. In FIG. 9, an image indicating a state of a product observed from above and an image indicating a state of the product observed from the side are generated. In addition, the web product image acquisition unit 11 may perform image editing processing such as enlargement and rotation.

In addition, a single web product image may include a plurality of products, as illustrated in FIG. 6. In this case, the web product image acquisition unit 11 may perform editing of individually extracting an area of each product and making separate image files.

The web product image acquisition unit 11 may perform the editing, based on a user input, or automatically and may perform a part of the editing, based on a user input, and the other part automatically. When the editing is performed automatically, for example, a condition for the planar shape of each product to be indicated in the product image pre-registered in the product database (image condition) may be registered in the product database, as illustrated in FIG. 7. For example, a condition for a planar shape may be defined as "a circle," "a rectangle (aspect ratio 3:7)," or the like or may be defined by an image indicating the silhouette of a product. In this case, the web product image acquisition unit 11 performs image editing of, for example, rotating a subject included in an image acquired from a web page determined by a web search based on a search condition of each product in such a way that the planar shape of the subject indicated in the image satisfies an image condition registered in association with the product.

Returning to FIG. 1, the product identification information acquisition unit 12 acquires product identification information of a product indicated by a web product image acquired from the web product image acquisition unit 11. Product identification information includes a product name and a product code.

For example, the product identification information acquisition unit 12 may acquire product identification information of each web product image from a web page in which the web product image is publicly available. Specifically, the product identification information acquisition unit 12 may search a web page for a keyword such as "product name" or "product code." Then, the product identification information acquisition unit 12 may acquire a word a positional relation of which with the keyword satisfies a predetermined condition (such as being consecutive) in the web page as product identification information.

As another example, the product identification information acquisition unit 12 may provide (for example, display on a display) candidates of product identification information of a product indicated by each web product image in association with the web product image to a user and acquire product identification information selected out of the candidates by the user.

For example, the product identification information acquisition unit 12 may provide, as a candidate, product identification information of a product associated with a search condition used for searching a web page in which each web product image is publicly available.

In addition, the product identification information acquisition unit 12 may provide a web page and/or a word extracted from the URL of the web page as a candidate. For example, the product identification information acquisition unit 12 may search a web page for a keyword such as "product name" or "product code" and provide a word displayed within a predetermined number of characters before or after the keyword as a candidate.

In addition, the product identification information acquisition unit 12 may compute a degree of similarity between a web product image and each product image of a plurality of products registered in the product database. For example, a degree of similarity may be indicated by a value ranging from 0 to 100% (similarity increases as the value approaches 100%) or a value ranging from 0 to 1 (similarity increases as the value approaches 1) or may be represented by another technique. Then, when a product for which a degree of similarity is equal to or greater than a first predetermined value exists, the product identification information acquisition unit 12 may provide product identification information of a product for which the aforementioned degree of similarity is equal to or greater than the first predetermined value as a candidate. On the other hand, when a product for which the aforementioned degree of similarity is equal to or greater than the first predetermined value does not exist, the product identification information acquisition unit 12 may provide product identification information of a product a product image of which is not registered in the product database as a candidate.

In addition, when a web page in which each web product image is publicly available includes a predetermined keyword, the product identification information acquisition unit 12 may provide product identification information of a product a product image of which is not registered in the product database as a candidate. The predetermined keyword refers to a wording that tends to be attached to a new product, such as "new product" and "New."

The registration unit 13 registers a web product image acquired by the web product image acquisition unit 11 and product identification information acquired by the product identification information acquisition unit 12 in association with each other in the product database.

Figure 10:
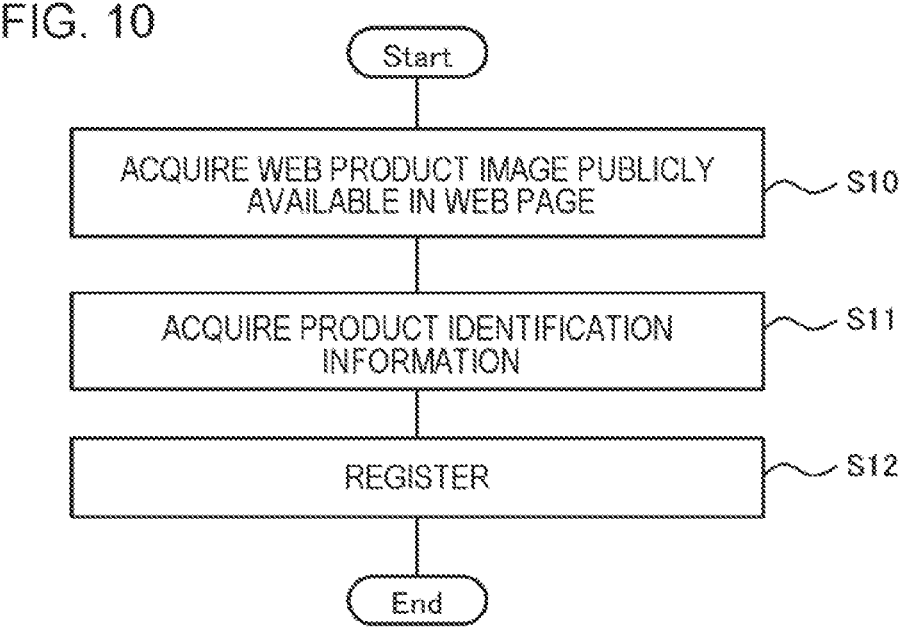
FIG. 10 is a flowchart illustrating an example of a flow of processing in the processing apparatus according to the present example embodiment.

Next, an example of a flow of processing in the processing apparatus 10 will be described by using a flowchart in FIG. 10.

First, in 810, the web product image acquisition unit 11 performs a web search at a predetermined timing, based on a predetermined search condition, and acquires an image publicly available in a determined web page. The predetermined timing may be a determined in advance (for example, at a predetermined time every day) or a timing when instruction input is performed by a user. Note that the web product image acquisition unit 11 may perform editing processing on the acquired image. Details of the editing processing are as described above, and therefore description thereof is omitted here.

Then, the web product image acquisition unit 11 eliminates an image satisfying an elimination condition out of the acquired images and acquires the remaining image as a web product image. For example, the web product image acquisition unit 11 may provide (for example, display on a display) the whole or a part of the acquired images to a user and accept an input about whether to keep each image as a web product image. Note that the processing is strictly an example, and, as described above, the web product image acquisition unit 11 may eliminate an image satisfying the elimination condition out of the acquired images by another type of processing. Further, the web product image acquisition unit 11 may perform editing processing on the acquired web product image. Details of the editing processing are as described above, and therefore description thereof is omitted here.

Next, in S11, the product identification information acquisition unit 12 acquires product identification information of a product indicated by the web product image acquired in S10.

Figure 11:
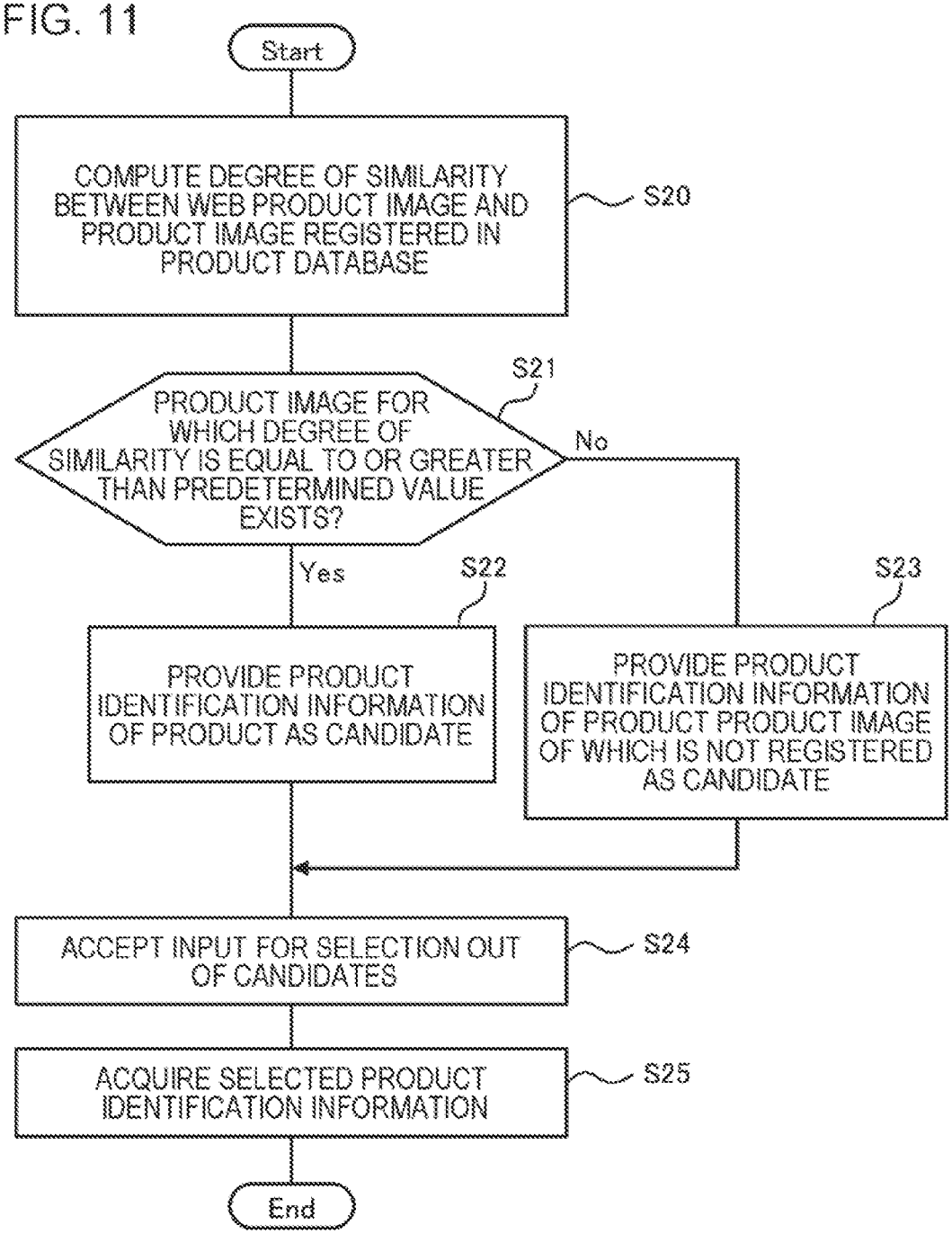
FIG. 11 is a flowchart illustrating an example of a flow of processing in the processing apparatus according to the present example embodiment.

An example of a flow of the processing in S11 will be described by using a flowchart in FIG. 11. Note that the flow of the processing described in the flowchart of S11 is strictly an example, and, as described above, the product identification information acquisition unit 12 may acquire product identification information by another type of processing.

First, the product identification information acquisition unit 12 computes a degree of similarity between the web product image and a product image of each of a plurality of products registered in the product database (S20). Next, the product identification information acquisition unit 12 determines whether a product image for which a degree of similarity is equal to or greater than the first predetermined value is registered in the product database (S21).

When a product image for which a degree of similarity is equal to or greater than the first predetermined value is registered in the product database (Yes in S21), the product identification information acquisition unit 12 provides product identification information associated with the product image in the product database as a candidate (S22).

On the other hand, when a product image for which a degree of similarity is equal to or greater than the first predetermined value is not registered in the product database (No in S21), the product identification information acquisition unit 12 provides product identification information of a product a product image of which is not registered in the product database (product identification information not associated with image identification information) as a candidate (S23).

Subsequently, when accepting an input for selecting one candidate out of the provided candidates (S24), the product identification information acquisition unit 12 acquires the selected product identification information (S25).

Returning to FIG. 10, in S12, the registration unit 13 registers the web product image acquired in S10 and the product identification information acquired in S11 in association with each other in the product database.

The processing apparatus 10 according to the present example embodiment described above can acquire a product image publicly available in a web page and register the image in the product database. As a result, a reference image of each product used in a technique for recognizing and registering a product to be checked out, based on a captured image of the product to be checked out and a preregistered reference image of each product, can be efficiently registered in the product database.

Further, the processing apparatus 10 according to the present example embodiment can acquire not only a product image but also product identification information by using a web page. Therefore, an operation of registering a reference image in the product database can be more efficiently performed.

Further, when acquiring a product image from a web page, the processing apparatus 10 according to the present example embodiment can automatically generate candidates of product identification information and register a product image associated with product identification information selected by a user out of the candidates. By including a checking and selection process by a user, the trouble of registering a product image acquired from a web page in association with incorrect product identification information can be suppressed. Further, since a user operation becomes a simple operation of selection from candidates, a user load can be lightened.

Further, since candidates are automatically generated by a characteristic technique as described above, the probability of the candidates including true product identification information increases. For example, when a product image for which a degree of similarity with a product image acquired from a web page is equal to or greater than the first predetermined value is registered in the product database, the processing apparatus 10 according to the present example embodiment can provide product identification information of a product determined by the similar product image as a candidate. On the other hand, when a product image for which a degree of similarity with a product image acquired from a web page is equal to or greater than the first predetermined value is not registered in the product database, the possibility of a product indicated by the product image acquired from the web page being a product having not been handled at the store up to that point is high; and therefore the processing apparatus 10 can provide product identification information of the product a product image of which is not registered in the product database as a candidate. The processing apparatus 10 thus determining candidates increases the probability of the candidates including true product identification information.

Further, when a predetermined keyword that tends to be attached to a new product, such as "new product" or "New," is included in a web page, the possibility of a product indicated by a product image acquired from the web page being a new product is high; and therefore the processing apparatus 10 according to the present example embodiment can provide product identification information of a product a product image of which is not registered in the product database as a candidate. The processing apparatus 10 thus determining candidates increases the probability of the candidates including true product identification information.

Second Example Embodiment

A processing apparatus 10 according to the present example embodiment differs from that according to the first example embodiment in, when a product image is registered in association with product identification information acquired by a product identification information acquisition unit 12, determining a difference between a web product image acquired by a web product image acquisition unit 11 and the registered product image and, when determining that a difference exists, newly registering the web product image in a product database. Details will be described below.

Figure 12:
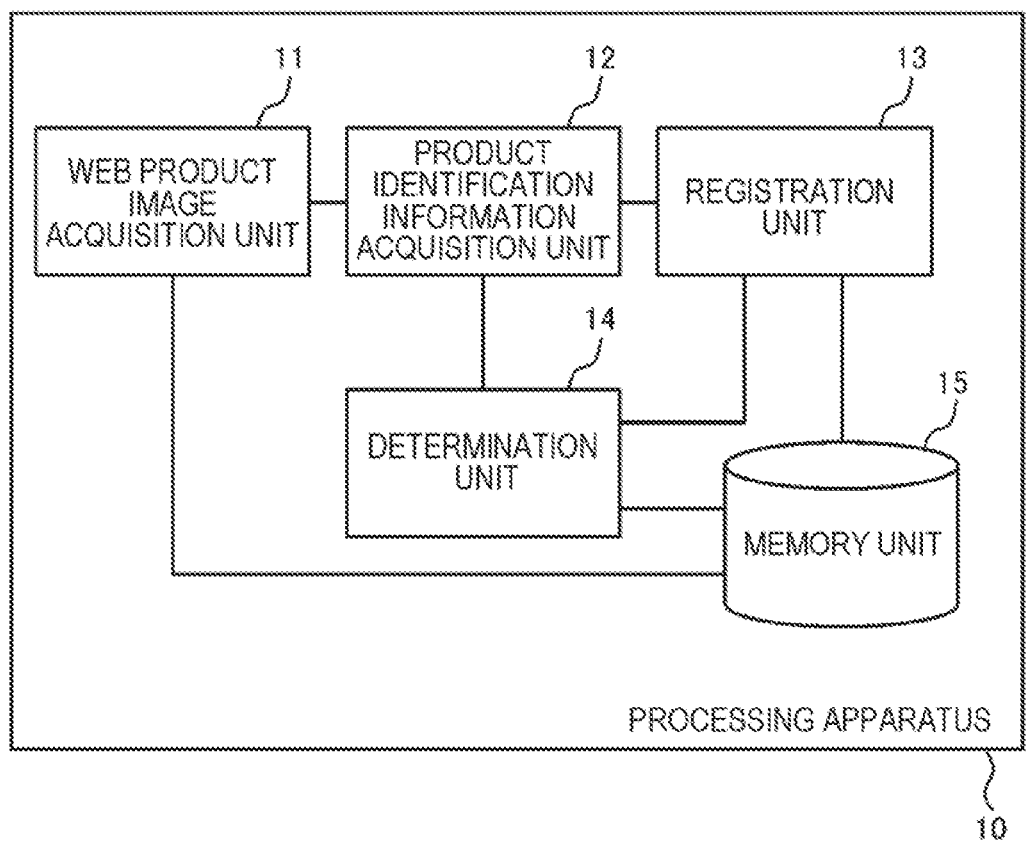
FIG. 12 is an example of a functional block diagram of a processing apparatus according to the present example embodiment.

FIG. 12 illustrates an example of a functional block diagram of the processing apparatus 10. As illustrated, the processing apparatus 10 includes the web product image acquisition unit 11, the product identification information acquisition unit 12, a registration unit 13, a determination unit 14, and a memory unit 15.

When product identification information acquired by the product identification information acquisition unit 12 is product identification information of a product a product image of which is registered in the product database, the determination unit 14 determines existence of a difference between a web product image and the registered product image. "A difference does not exist" may be a concept including not only a case that the web product image and the registered product image are completely identical but also a case that a slight difference exists.

For example, the determination unit 14 outputs (for example, displays on a display) a web product image and a registered product image and accepts a user input indicating existence of a difference. The determination unit 14 may output the web product image and the registered product image side by side.

In addition, the determination unit 14 may determine existence of a difference, based on a degree of similarity between a web product image and a registered product image. For example, the determination unit 14 may determine that a difference exists when a degree of similarity between a web product image and a registered product image is less than a second predetermined value. Note that the first predetermined value described in the first example embodiment and the second predetermined value may be the same or different.

In a case that the determination unit 14 determines that a difference exists when the product identification information acquisition unit 12 acquires product identification information of a product a product image of which is registered in the product database, the registration unit 13 registers the web product image in the product database and, in a case that the determination unit 14 determines that a difference does not exist, does not register the web product image in the product database. The remaining configuration of the registration unit 13 is similar to that according to the first example embodiment.

Further, configurations of the web product image acquisition unit 11, the product identification information acquisition unit 12, and the memory unit 15 are similar to those according to the first example embodiment.

Figure 13:
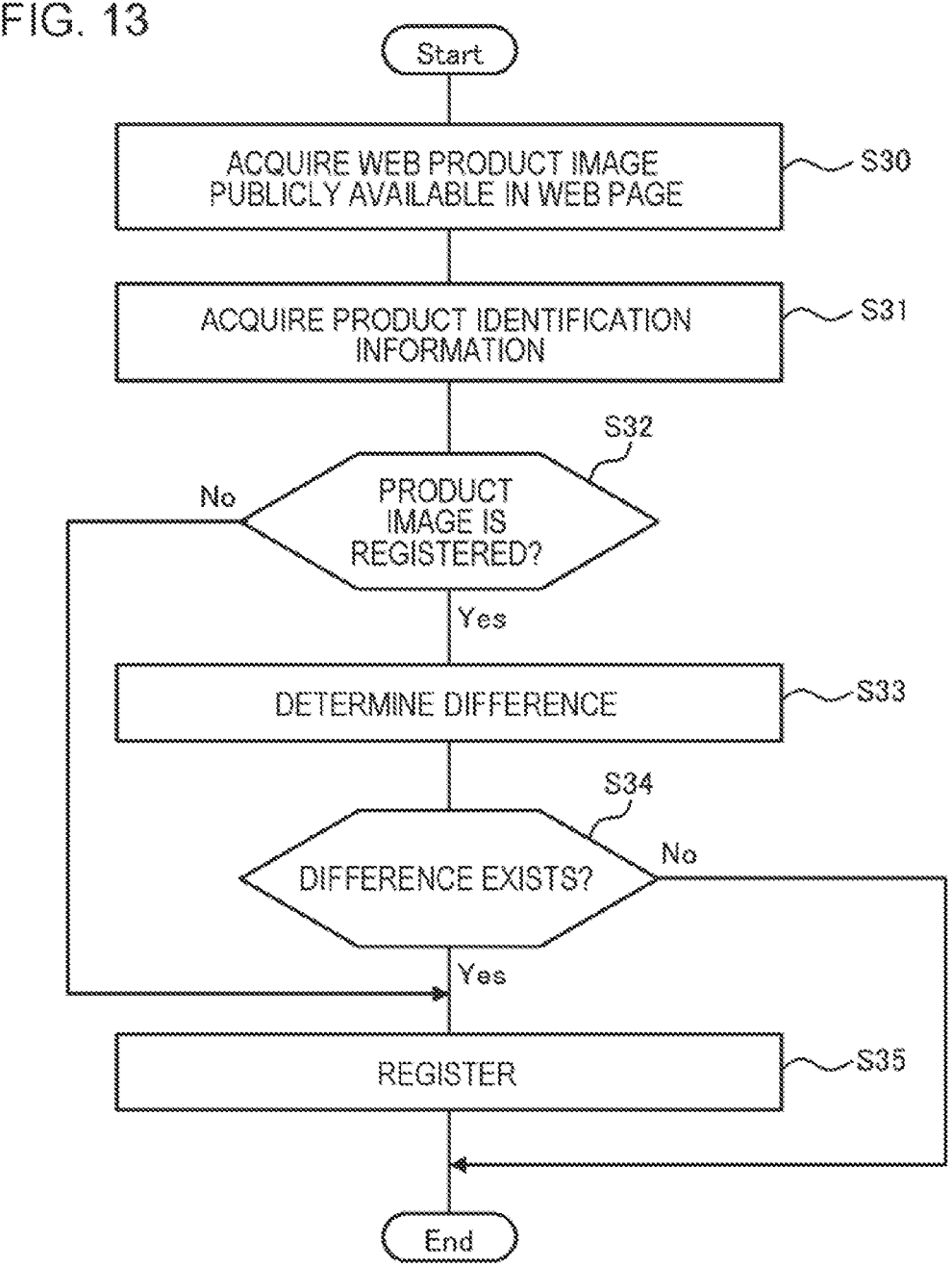
FIG. 13 is a flowchart illustrating an example of a flow of processing in the processing apparatus according to the present example embodiment.

Next, an example of a flow of processing in the processing apparatus 10 will be described by using a flowchart in FIG. 13.

First, in S30, the web product image acquisition unit 11 performs a web search at a predetermined timing, based on a predetermined search condition, and acquires a web product image publicly available in a determined web page. Next, in S31, the product identification information acquisition unit 12 acquires product identification information of a product indicated by the web product image acquired in S30. The processing in S30 and S31 is similar to the processing in S10 and S11 described in the first example embodiment.

After S31, the determination unit 14 checks whether the product identification information acquired in S31 is product identification information of a product a product image of which is registered in the product database (S32).

When the product identification information is product identification information of a product a product image of which is registered (Yes in S32), the determination unit 14 determines existence of a difference between the web product image acquired in S30 and a product image registered in association with the product identification information acquired in S31 (S33). For example, the determination unit 14 outputs (for example, displays on a display) the web product image and the registered product image side by side and accepts a user input indicating existence of a difference.

When the determination result in S33 is "a difference exists" (Yes in S34), the registration unit 13 registers the web product image acquired in S30 in the product database in association with the product identification information acquired in S31 (S35).

On the other hand, when the determination result in S33 is "a difference does not exist" (No in S34), the registration unit 13 does not register the web product image acquired in S30 in the product database.

Further, when the product identification information acquired in S31 is not product identification information of a product a product image of which is registered (No in S32), the registration unit 13 registers the web product image acquired in S30 in association with the product identification information acquired in S31 in the product database (S35).

As described above, the processing apparatus 10 according to the present example embodiment provides advantageous effects similar to those of the first example embodiment. Further, the processing apparatus 10 according to the present example embodiment can acquire a product image of a certain product from a web page, then determine a difference between the product image and a product image of the product being already registered, and when a difference exists, register the product image acquired from the web page. Such a processing apparatus 10 can register a product image acquired from a web page only when an appearance of the product is changed due to a renewal or the like, and update or the like of a registered product image is required.

Note that "acquisition" herein may include "the apparatus getting data stored in another apparatus or a storage medium (active acquisition)" in accordance with a user input or an instruction by a program, such as reception as a result of making a request or an inquiry to another apparatus, and readout as a result of accessing another apparatus or a storage medium. Further, "acquisition" may include "inputting data output from another apparatus to the apparatus (passive acquisition)" in accordance with a user input or an instruction by a program, such as receiving delivered (or, for example, transmitted or push notified) data. Further, "acquisition" may include selective acquisition from received data or information, and "generating new data by data editing (such as conversion to text, data sorting, partial data extraction, and file format change) or the like and acquiring the new data."

While the present invention has been particularly shown and described with reference to example embodiments (and examples) thereof, the invention is not limited to these example embodiments (and examples). It will be understood by a person skilled in the art that various changes in form and details may be made therein without departing from the spirit and scope of the present invention as defined by the claims.

A part or the whole of the aforementioned example embodiments may also be described as the following supplementary notes but is not limited thereto.

1. A processing apparatus including:
   a web product image acquisition means for acquiring a web product image publicly available in a web page determined based on a predetermined search condition;
   a product identification information acquisition means for acquiring product identification information of a product indicated by the web product image; and
   a registration means for registering the web product image and the product identification information in association with each other in a product database.
2. The processing apparatus according to 1, wherein
   the product identification information acquisition means acquires the product identification information from the web page.
3. The processing apparatus according to 1, wherein
   the product identification information acquisition means acquires the product identification information selected by a user out of one or more candidates of the product identification information.
4. The processing apparatus according to 3, wherein
   a product image of each of a plurality of products is registered in the product database, and
   the product identification information acquisition means provides, as the candidate, the product identification information of a product for which a degree of similarity between the product image and the web product image is equal to or greater than a predetermined value.
5. The processing apparatus according to 3 or 4, wherein
   a product image of each of a plurality of products is registered in the product database,
   a product whose product image is registered and a product whose product image is not registered exist in products registered in the product database, and, when a product for which a degree of similarity between the product image and the web product image is equal to or greater than a predetermined value does not exist, the product identification information acquisition means provides, as the candidate, the product identification information of the product whose product image is not registered.

6. The processing apparatus according to 3 or 4, wherein a product image of each of a plurality of products is registered in the product database,
a product whose product image is registered and a product whose product image is not registered exist in products registered in the product database, and,
when the web page includes a predetermined keyword, the product identification information acquisition means displays, as the candidate, the product identification information of the product whose product image is not registered.

7. The processing apparatus according to any one of 1 to 6, wherein
a product image of each of a plurality of products is registered in the product database,
the processing apparatus further comprises determination means for, when the product identification information acquisition means acquires the product identification information of the product whose product image is registered in the product database, determining a difference between the web product image and the registered product image, and,
in a case that the product identification information acquisition means acquires the product identification information of the product whose product image is registered in the product database, the registration means registers the web product image in the product database when the difference exists and does not register the web product image in the product database when the difference does not exist.

8. The processing apparatus according to 7, wherein the determination means outputs the web product image and the registered product image and accepts a user input indicating a difference.

9. The processing apparatus according to 7, wherein the determination means determines a difference, based on a degree of similarity between the web product image and the registered product image.

10. The processing apparatus according to any one of 1 to 9, wherein
the web product image acquisition means edits the web product image in such a way that a product shape indicated by the web product image satisfies a predetermined condition.

11. The processing apparatus according to 10, wherein the predetermined condition is preregistered for each product registered in the product database.

12. A processing method including, by a computer:
acquiring a web product image publicly available in a web page determined based on a predetermined search condition;
acquiring product identification information of a product indicated by the web product image; and
registering the web product image and the product identification information in association with each other in a product database.

13. A program causing a computer to function as:
a web product image acquisition means for acquiring a web product image publicly available in a web page determined based on a predetermined search condition;
a product identification information acquisition means for acquiring product identification information of a product indicated by the web product image; and
a registration means for registering the web product image and the product identification information in association with each other in a product database.

What is claimed is:
1. A processing apparatus comprising:
at least one memory configured to store one or more instructions; and
at least one processor configured to execute the one or more instructions to:
receive, as a search condition, keywords linked by logical operators;
perform a web search using the search condition to retrieve a web page that is publicly available;
acquire a web product image in the web page;
perform image processing on the web product image to remove a background area of the web product image;
perform image processing on the web product image to change a directional view of the web product image from a current directional view to a predetermined directional view corresponding to a plurality of product images registered in a product database;
generate additional web product images based on the web product image, each additional web product image corresponding to a different directional view;
compute, for each of a plurality of products respectively having the plurality of product images registered in the product database, a degree of similarity between the web product image and the product image of the product;
when the degree of similarity of none of the plurality of products is equal to or greater than a predetermined value, specify an unregistered product having a product image that is not registered in the product database as a specified candidate of product identification information;
acquire the product identification information as selected by a user out of one or more candidates of the product identification information including the specified candidate; and
register the web product image and the additional web product images and the product identification information in association with each other in the product database.

2. The processing apparatus according to claim 1, wherein the processor is further configured to execute the one or more instructions to acquire the product identification information from the web page.

3. The processing apparatus according to claim 1, wherein the processor is further configured to execute the one or more instructions to, when the degree of similarity of one of the plurality of products is equal to or greater than the predetermined value, provide, as the specified candidate, product identification information of the one product.

4. The processing apparatus according to claim 1, wherein a product exists for which no product image is registered in the product database, and, the processor is further configured to execute the one or more instructions to display, as the candidate, product identification information of the product for which no product image is registered, when the web page includes a predetermined keyword.

5. The processing apparatus according to claim 1, wherein the processor is further configured to execute the one or more instructions to:

determine, for each of the plurality of products, whether a difference between the web product image and the product image of the product exists;

register the web product image in the product database when the difference exists; and not register the web product image in the product database when the difference does not exist.

6. The processing apparatus according to claim 5, wherein the processor is further configured to execute the one or more instructions to output the web product image and the registered product image and accept a user input indicating the difference.

7. The processing apparatus according to claim 5, wherein the processor is further configured to execute the one or more instructions to determine the difference based on the degree of similarity.

8. The processing apparatus according to claim 1, wherein the processor is further configured to execute the one or more instructions to edit the web product image in such a way that a product shape indicated by the web product image satisfies a predetermined condition.

9. The processing apparatus according to claim 8, wherein the predetermined condition is preregistered for each product registered in the product database.

10. A processing method performed by a computer and comprising:

receiving, as a search condition, keywords linked by logical operators;

performing a web search using the search condition to retrieve a web page that is publicly available;

acquiring a web product image in the web page;

performing image processing on the web product image to remove a background area of the web product image;

performing image processing on the web product image to change a directional view of the web product image from a current directional view to a predetermined directional view corresponding to a plurality of product images registered in a product database;

generating additional web product images based on the web product image, each additional web product image corresponding to a different directional view;

computing, for each of a plurality of products respectively having the plurality of product images registered in the product database, a degree of similarity between the web product image and the product image of the product;

when the degree of similarity of none of the plurality of products is equal to or greater than a predetermined value, specifying an unregistered product having a product image that is not registered in the product database as a specified candidate of product identification information;

acquiring the product identification information as selected by a user out of one or more candidates of the product identification information including the specified candidate; and registering the web product image and the additional web product images and the product identification information in association with each other in the product database.

11. A non-transitory storage medium storing a program causing executable by a computer to:

receive, as a search condition, keywords linked by logical operators;

perform a web search using the search condition to retrieve a web page that is publicly available;

acquire a web product image in the web page;

perform image processing on the web product image to remove a background area of the web product image;

perform image processing on the web product image to change a directional view of the web product image from a current directional view to a predetermined directional view corresponding to a plurality of product images registered in a product database;

generate additional web product images based on the web product image, each additional web product image corresponding to a different directional view;

compute, for each of a plurality of products respectively having the plurality of product images registered in the product database, a degree of similarity between the web product image and the product image of the product;

when the degree of similarity of none of the plurality of products is equal to or greater than a predetermined value, specify an unregistered product having a product image that is not registered in the product database as a specified candidate of product identification information;

acquire the product identification information as selected by a user out of one or more candidates of the product identification information including the specified candidate; and register the web product image and the additional web product images and the product identification information in association with each other in the product database.

* * * * *